(12) United States Patent
Gupta et al.

(10) Patent No.: US 10,992,607 B2
(45) Date of Patent: Apr. 27, 2021

(54) CONTEXTUAL MESSAGE DELIVERY

(71) Applicant: Microsoft Technology Licensing, LLC, Redmond, WA (US)

(72) Inventors: Rahul Gupta, Hyderabad (IN); Pradeep Kumar Reddy K, Hyderabad (IN); Bhavesh Sharma, Hyderabad (IN); Manish Kansal, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 45 days.

(21) Appl. No.: 15/928,809

(22) Filed: Mar. 22, 2018

(65) Prior Publication Data
US 2019/0297034 A1 Sep. 26, 2019

(51) Int. Cl.
*G06F 15/16* (2006.01)
*H04L 12/58* (2006.01)
*G06Q 10/10* (2012.01)

(52) U.S. Cl.
CPC .......... *H04L 51/04* (2013.01); *G06Q 10/107* (2013.01); *G06Q 10/1093* (2013.01); *H04L 51/38* (2013.01)

(58) Field of Classification Search
CPC .......... H04L 51/04; H04L 51/38; H04L 51/14
USPC ................. 709/206, 203, 204, 207
See application file for complete search history.

(56) References Cited

U.S. PATENT DOCUMENTS

| | | | | |
|---|---|---|---|---|
| 2004/0254998 A1* | 12/2004 | Horvitz | ................ | G06Q 10/107 709/206 |
| 2005/0018820 A1* | 1/2005 | Chaddha | ................ | H04L 51/24 379/88.13 |
| 2007/0232274 A1* | 10/2007 | Jung | ................ | H04M 1/72552 455/412.1 |
| 2010/0223341 A1* | 9/2010 | Manolescu | ............. | H04L 51/32 709/206 |
| 2012/0117165 A1* | 5/2012 | Shenfield | ................ | H04L 67/06 709/206 |

(Continued)

FOREIGN PATENT DOCUMENTS

WO 2015152879 A1 10/2015

OTHER PUBLICATIONS

Nakanishi, et al., "Context Aware Messaging Service: A Dynamical Messaging Delivery using Location Information and Schedule Information", In Personal Technologies, vol. 4, Issue 4, Dec. 1, 2000, pp. 221-224.

(Continued)

*Primary Examiner* — Kaylee J Huang
(74) *Attorney, Agent, or Firm* — Shook, Hardy and Bacon, L.L.P.

(57) ABSTRACT

Examples are disclosed herein that relate to delivering electronic messages to intended recipients based on detected contextual events. One example provides a computing system, comprising a logic subsystem, and a storage subsystem comprising instructions executable by the logic subsystem to receive an input of a message, store the message in a data store for delivery to an intended recipient, determine contextual information for the message and store the contextual information for the message in the data store, detect a contextual event that matches a triggering condition for delivery of the message based upon the contextual information for the message, and based upon the contextual event matching the triggering condition, send the message to a device associated with the intended recipient.

20 Claims, 7 Drawing Sheets

(56) References Cited

U.S. PATENT DOCUMENTS

| | | | | |
|---|---|---|---|---|
| 2012/0191790 | A1* | 7/2012 | Abadir | H04L 51/14 |
| | | | | 709/206 |
| 2014/0141752 | A1* | 5/2014 | Olschansky | H04L 51/14 |
| | | | | 455/412.1 |
| 2014/0172988 | A1* | 6/2014 | Baldwin | H04L 51/12 |
| | | | | 709/206 |
| 2015/0095354 | A1* | 4/2015 | Miller | G06F 16/335 |
| | | | | 707/754 |
| 2015/0180845 | A1* | 6/2015 | Uomini | H04L 63/083 |
| | | | | 726/3 |
| 2015/0358766 | A1* | 12/2015 | McDevitt | G06Q 30/0261 |
| | | | | 705/14.58 |
| 2016/0112359 | A1* | 4/2016 | Allen | H04L 51/14 |
| | | | | 709/206 |
| 2016/0301648 | A1* | 10/2016 | Mistry | H04L 51/24 |
| 2016/0350139 | A1* | 12/2016 | Gandhi | G06F 9/44505 |
| 2017/0004126 | A1* | 1/2017 | Li | G06F 17/248 |
| 2018/0123993 | A1* | 5/2018 | Song | H04L 51/12 |

OTHER PUBLICATIONS

"International Search Report and Written Opinion Issued in PCT Application No. PCT/US2019/022161", dated May 21, 2019, 11 Pages.

\* cited by examiner

CONTEXTUAL MESSAGE DELIVERY

BACKGROUND

Digital messages may be exchanged via many different types of electronic messaging services, including email and text messaging.

SUMMARY

Examples are disclosed herein that relate to delivering electronic messages to intended recipients based on detected contextual events. One example provides a computing system comprising a logic subsystem, and a storage subsystem comprising instructions executable by the logic subsystem to receive an input of a message, store the message in a data store, determine contextual information for the message, and store the contextual information for the message in the data store. The instructions are further executable to detect a contextual event that matches a triggering condition for delivery of the message based upon the contextual information for the message, and based upon the contextual event matching the triggering condition, send the message to a device associated with the intended recipient.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Current digital messaging platforms, such as text messaging and email, may deliver a message to a recipient in real time when a recipient user's messaging device is connected to a computer network and the messaging application is running, or at a later time based upon the establishment of a network connection and/or the messaging application being launched. However, a user may forget a message before the message becomes actionable if the message is delivered and presented in a context in which the recipient cannot currently act on the message. For example, a message asking a spouse to pick up groceries on the way home from work that is delivered much earlier in the day may be forgotten by the time the spouse leaves work.

Accordingly, examples are disclosed that relate to delivering a message to an intended recipient based upon detecting a contextual event that is relevant to the context of the message, such as a contextual event indicating that the message may be currently actionable. Contextual triggering of message delivery as disclosed herein may be used with any suitable form of messaging, including text messages, emails, voicemails, and social media notifications, as examples.

Figure 1:
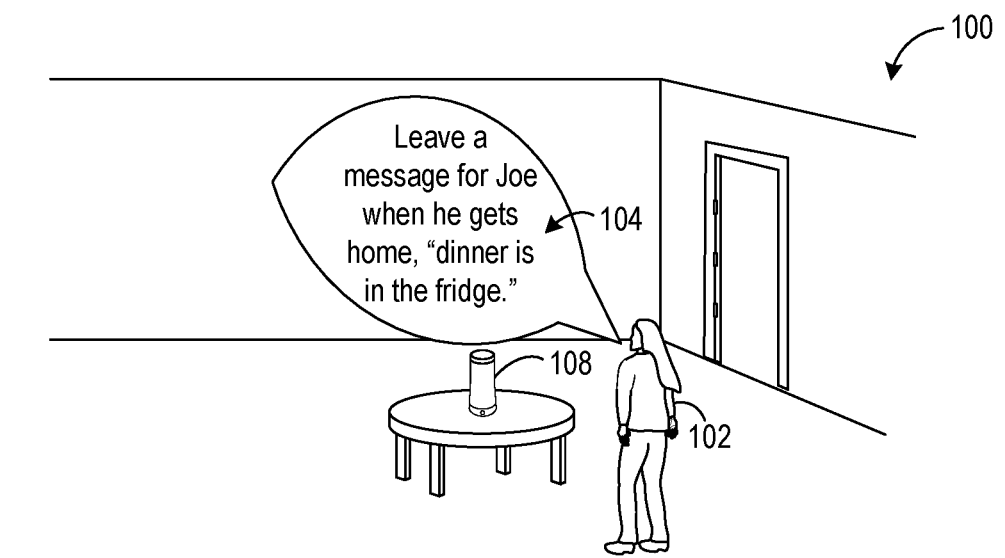
FIG. 1 shows an example use scenario for delivering a message based on a contextual event.
Figure 1:
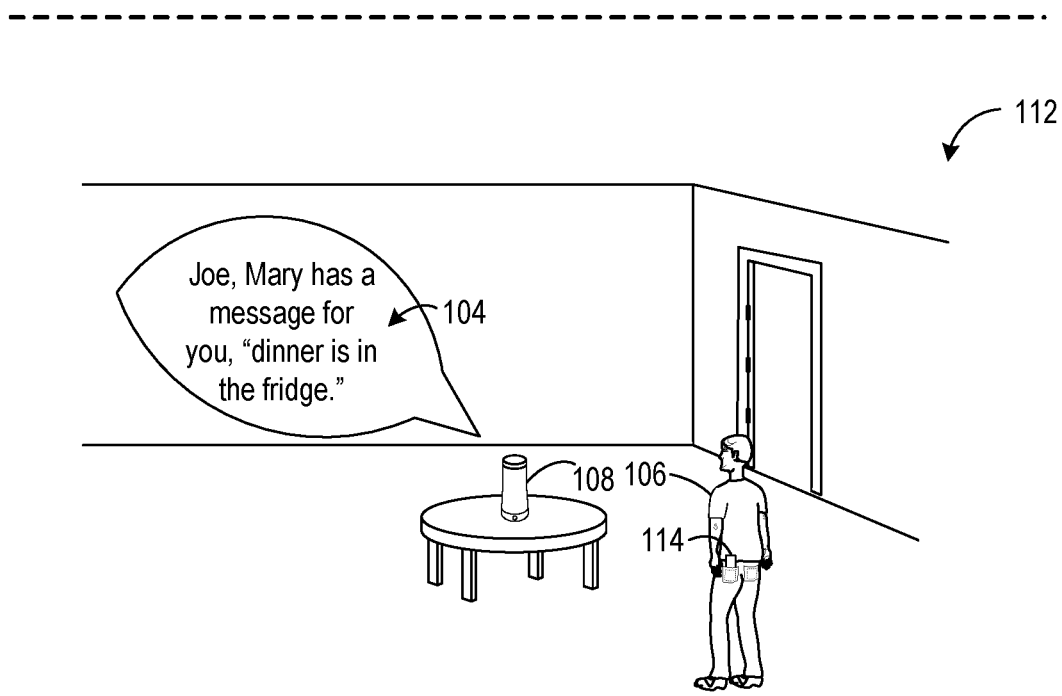

FIG. 1 shows an example use scenario illustrating the contextual delivery of a message. In scenario 100, a first user 102 "Mary" leaves a message 104 for an intended recipient 106 "Joe" via a digital assistant device 108 at 6:00 PM in the evening. The digital assistant device 108 may act as a communal device for the family home, allowing multi-user logins and identification of each user based on a voice signature, and providing personalized interactions for each user through the use of one or more microphones and one or more speakers. Upon input of the message, the digital assistant device 108 may resolve an identity of the intended recipient Joe, e.g. using a remote digital personal assistant service (not shown in FIG. 1) or other suitable remote service, as explained in more detail below. Upon resolving the identity of the intended recipient 106, the remote digital personal assistant service may store the message 104 in a data store, and analyze the content of the message 104 to determine contextual information for the message 104. In this example, the message content indicates that the message 104 is on the subject of dinner, which may be recognized as being related to the context of a home environment and an evening time. Next referring to 112, the digital assistant device 108 may detect that Joe has arrived home at 9:00 PM, and send this information to the remote digital personal assistant service. The remote digital personal assistant service may recognize this as a contextual event that is relevant to the message that Mary left for Joe, and thus trigger the sending of the message 104 stored in the data store to the digital assistant device 108 for presentation to Joe.

Any suitable contextual information may be used to determine that Joe has returned home around dinner time. For example, the digital assistant device 108 may detect Joe's presence via voice recognition, and send this information to the remote digital personal assistant service. As another example, a mobile device 114 (e.g. a smartphone) carried by Joe may provide location data (e.g. GPS data and/or WiFi access point data) to the remote digital personal assistant service, or the digital assistant device 108 may detect that the mobile device 114 has joined a local area network to which the digital assistant device 108 is connected. As a further example, the digital assistant device 108 may capture an image of Joe via an image sensor on the digital assistant device 108 and recognize Joe via facial recognition. Additionally, a likelihood that Joe has returned home may be inferred from past observed behaviors of Joe. For example, the remote digital personal assistant service may have information regarding Joe's schedule for the day or his typical schedule, such as from a calendar application or from past tracked user behavior, and may have detected that Joe typically arrives home around 9:00 PM. Each of these are examples of contextual events that may be used to trigger message delivery.

Upon detecting the contextual event, the remote digital personal assistant service may compare the contextual event to the contextual information determined for the message, and determine that the contextual event matches the contextual information determined for the message 104. The term "matches" as used herein indicates that the contextual event satisfies a contextual triggering condition for delivering the message 104. Any suitable appropriate triggering conditions may be determined for a message based on message content, such as a time, device location, identification of a device currently in use by the user, classifications/probabilities output by a trained machine learning function, etc. Based upon the determination that the contextual event matches the contextual information for the message 104, the remote digital personal assistant service triggers sending of the message 104 to the digital assistant device 108 or other suitable device (e.g. a device determined to be currently active, such as mobile device 114). The term "delivery" is used herein to signify the sending of messages from a remote service (e.g. from a remote data store) to an end user device.

Figure 2:
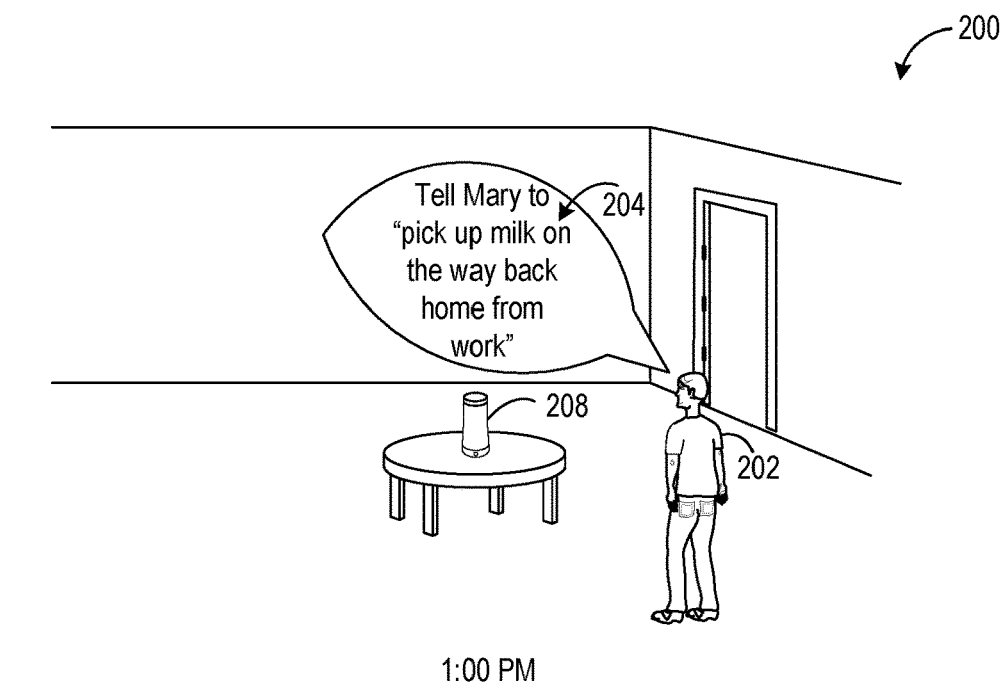
FIG. 2 shows another example use scenario for delivering a message based on a contextual event.
Figure 2:
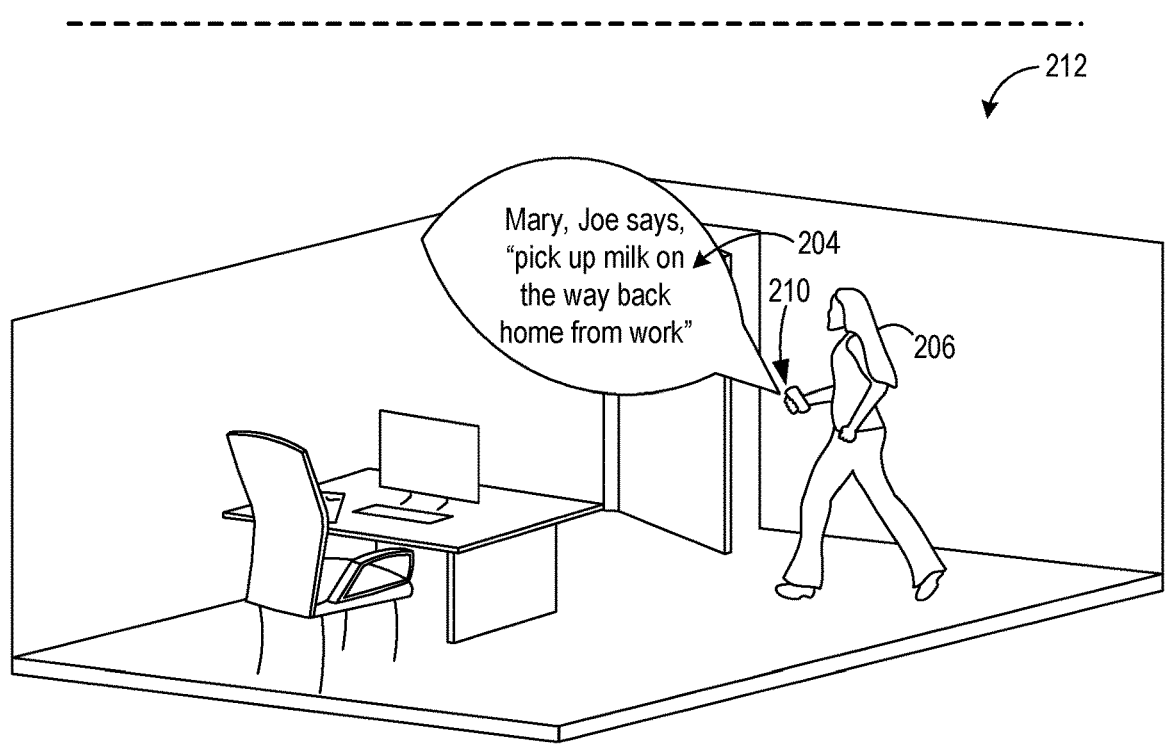

FIG. 2 shows another example use scenario 200 for the contextual delivery of messages. In scenario 200, first user 202 Joe leaves a message 204 for intended recipient 206 Mary via digital assistant device 208 at 1:00 PM, requesting Mary to pick up milk on the way back home from work. In this example, in addition to resolving the identity of "Mary," the remote personal digital assistant service also may determine the meaning of "on the way back home from work." For example, the remote personal digital assistant service may resolve the locations "work" and "home," e.g. from addresses stored in a user account, and also understand from prior behavior patterns that Mary travels home from work at a fairly regular time each day. The remote personal digital assistant service stores this determined contextual information with the message. Then, instead of immediately delivering the message to a device of Mary, the message 204 is delivered to a mobile device 210 of Mary's at 6:00 PM, when it is determined that Mary is leaving work (e.g. based upon location data and/or a determined pattern of Mary's typical day based upon historic data) and thus when the message is more actionable. The message may be sent specifically to mobile device 210 based upon detecting that the device is being actively used, and/or based upon the mobile device being a most likely device to be used in that context (e.g. based upon past observed behaviors). The message may also be sent to Mary's mobile device 210 at another suitable time, such as when Mary has left her office building, after Mary has gotten into her car, or when Mary is already on the way home and is near a grocery store, as examples.

Figure 3:
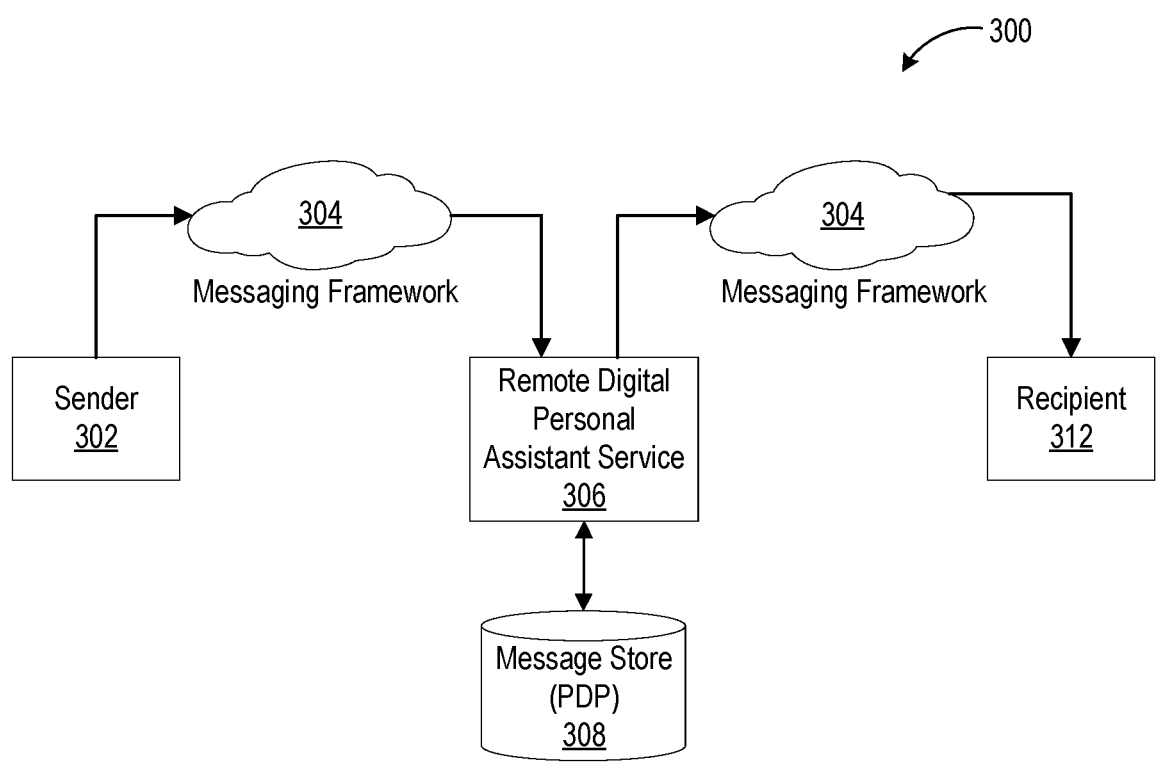
FIG. 3 shows a schematic depiction of an example contextual messaging system.

FIG. 3 shows a schematic depiction of an example contextual messaging system 300. In contrast to current messaging platforms, which may send message data from a sender directly to a recipient via a messaging framework (e.g. client and server applications and associated computing and communication hardware, firmware and/or software), system 300 sends message data via messaging framework 304 from a sender 302 to the remote digital personal assistant service 306. The remote digital personal assistant service 306 may perform contextual analysis to determine a delivery context in which the message may be actionable, and store the message in a message data store 308 along with determined contextual data for the message for later contextually triggered delivery. Provable Data Possession (PDP) or other suitable protocol may be used to ensure the integrity of the data being stored. Upon detecting a contextual event determined to be relevant to the stored message, the stored message may be retrieved for delivery to the intended recipient 312 via the message framework 304.

Figure 4:
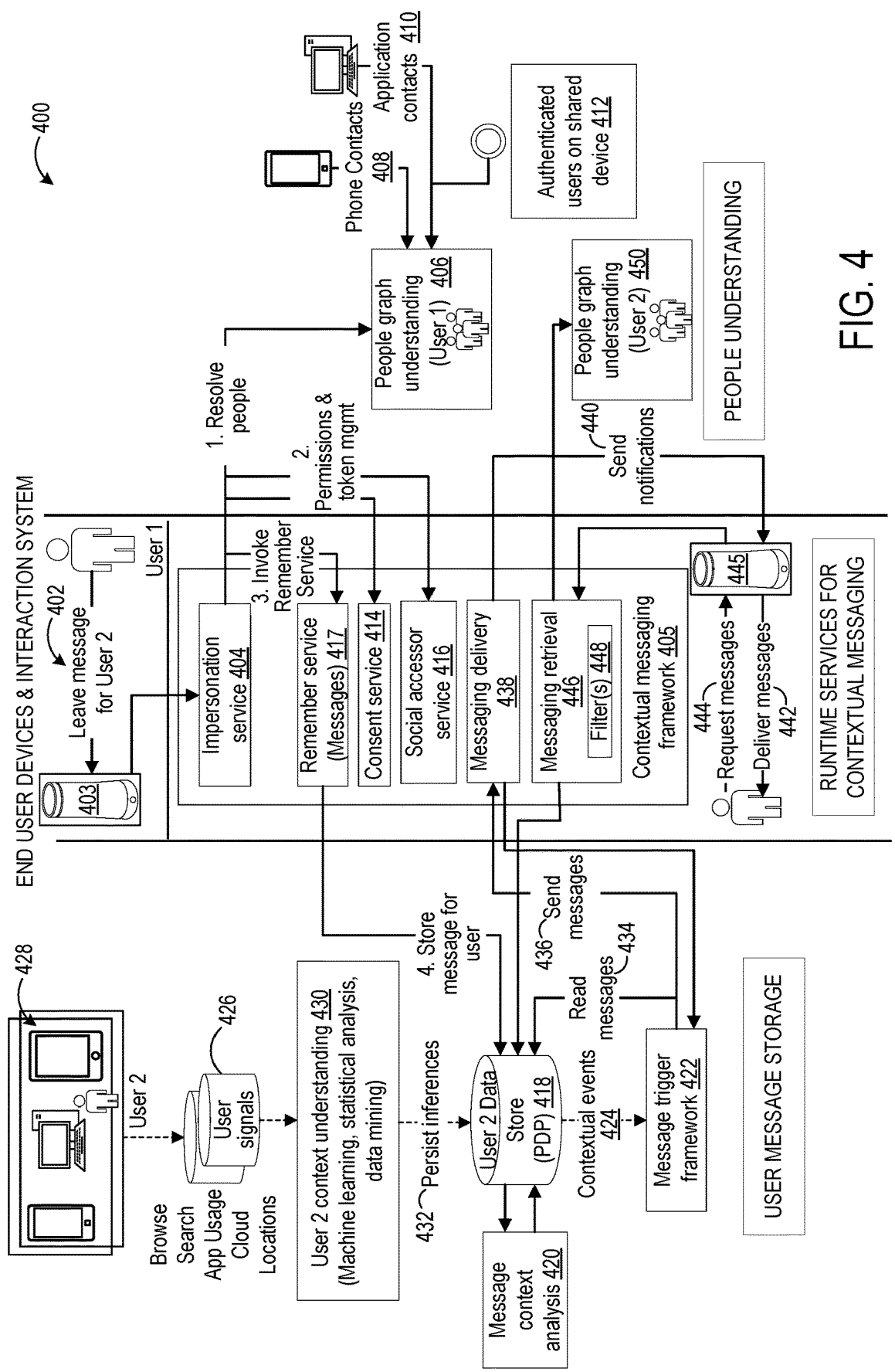
FIG. 4 shows data flow through an example contextual messaging system.

FIG. 4 illustrates data flow through an example contextual messaging system 400. Contextual messaging system 400 is an example implementation of contextual messaging system 300, and illustrates system components related to runtime services for contextual messaging, user message storage, and people understanding. The various components of contextual messaging system 400 may be implemented via a cloud-based service residing at computing devices (e.g. data center computers) remote from the end users (e.g. a personal digital assistant service), and/or may be implemented at least in part on client applications running on end user devices.

At 402, User 1 leaves a message for intended recipient User 2 using a familiar name of User 2. In this example, the message is input via a digital assistant device 403. In other examples, any other suitable messaging device may be used, including but not limited to a mobile device, tablet computer, wearable device (e.g. smart watch, head-mounted device), laptop or desktop computer. In the depicted example, the intended recipient is one individual, but in other examples User 1 may leave a message for specified group of users, or for any user having access to an intended recipient device. The message may take any suitable form, such as a text message, email message, voicemail message, or social media message.

The message is sent to an impersonation service 404 of a contextual messaging framework 405. The impersonation service 404 may perform several functions. First, the impersonation service 404 may resolve an identity of the intended recipient(s) by comparing the familiar name of User 2 to data stored in a people graph 406 for User 1. The people graph 406 may be stored in a user account of User 1, and updated/maintained by a personal assistant service running remotely from User 1's device 403, for example. Any suitable method may be used to resolve the identity of the intended recipient. For example, one or more speech recognition algorithms (e.g. hidden Markov model, neural network, or end-to-end automatic speech recognition-based approach) may be used to identify words in the text, which then may be compared to the people graph to determine whether the message content includes a contact's name or reference to a person having recognized relationship to User 1 (e.g. "my manager," "my husband"). The people graph 406 may be constructed for User 1 based on any suitable information, such as User 1's mobile phone contacts 408, application contacts 410 (e.g. from email, social media), authenticated users on a shared device 412, and/or any other suitable information sources. If any ambiguity arises regarding the identity of the intended recipient, the impersonation service may try to disambiguate the identity automatically based on the User 1 people graph 406, or may prompt User 1 to provide a user input of the intended recipient.

The impersonation service 404 further may obtain and provide permissions for accessing a data store of the intended recipient(s) (e.g. User 2). In the depicted example, the impersonation service 404 calls a consent service 414 to create permissions for a selected data store out of a plurality of data stores for messaging system users. These permissions are used to fetch an access token from a social accessor service 416 for accessing the data store in which the message will be stored. The impersonation service 404 additionally is configured to invoke a remember service 417, which is configured to read from, write to, update, and/or delete from the user 2 data store and thus can store the message in the User 2 data store 418. Where the message is intended for a group of users, the message may be stored in a respective data store for each intended recipient of the group. In other examples, the message may be stored on a data store for User 1, such as when the message is a note-to-self for User 1, or when the message is intended for consumption by anyone with access to a message presentation device. In yet other examples, where the messages are email messages, a copy of the message as sent may be stored in the sender's data store as well as in the recipient's data store in some examples. Additionally, where the messages are text messages, a message can be stored in a common data store against a conversation ID (session ID) instead of storing it in individual data stores of sender or recipient, and both sender and recipient have permissions on the conversation ID.

Continuing, FIG. 4 further shows a message context analysis module 420 configured to parse and analyze the content of the message, and thereby to determine contextual information for the message. Contextual information for a message may be determined, for example, based on message content, such as keywords located in the message that indicate or infer a location or a time for the message to be sent. Contextual information for a message may also be based on metadata for that message, such as a sender of the message, a past message history associated with the message, flag/importance status of the message, etc. Message context analysis 420 may analyze messages stored in the User 2 data store 418 (as well as the data stores of other users), and associate contextual information with each message for storage in the User 2 data store 418. The contextual information is thus persisted in the User 2 data store 418 and may in turn be provided to a message trigger framework 422.

The message trigger framework 422 is configured to determine when to send a particular message stored in the User 2 data store 418 based upon detected contextual events 424 for User 2. Contextual events 424 may be identified in various manners. For example, one or more of User 2's devices may have a digital personal assistant client application running locally on the device, and the digital personal assistant client application on a device may provide various types of information regarding user actions and/or situations to the remote digital personal assistant service. Examples of such information include browser interactions, searches interactions, application usage information (e.g. data regarding when messages were read, marked unread, etc.), cloud service interactions (e.g. interactions with cloud storage and/or cloud-hosted applications), and locations detected by location sensors on the device (e.g. global positioning sensor information and/or WiFi access point information). Such information, and/or other information, may be stored as user signals 426. These user signals 426 may be analyzed by a User 2 context understanding module at 430 to produce inferences regarding contextual events that may be used to trigger contextual message delivery. Such inferences may include detected one-time events (e.g. email content/calendar data/search data, that indicates the scheduling of an upcoming flight), situational information (e.g. location, time and/or device in use information) and/or information regarding user habits (e.g. detected patterns regarding day-to-day routines), as examples.

In some instances, contextual events can be detected by relatively simple observations of available application data and/or sensor data—e.g. location data may be used to indicate that a user has arrived at work or at home. Other contextual events that are less readily detected by simple observation may be inferred via machine learning, statistical analysis, and/or data mining. Any suitable type of machine learning algorithm(s) may be utilized to determine inferences regarding possible contextual events. Examples of suitable machine learning models that may be used to identify contextual events from features in user signals include, but are not limited to, neural network models (including deep learning models), decision tree models, and support vector machine models. Further, any suitable features from the available user signals may be used as inputs for such models.

Machine leaning models may be trained to provide any suitable output related to contextual events. For example, a machine learning model may be trained to classify particular contexts in terms of a likelihood that a message having certain message features (content and/or metadata features) will be read based upon the current user signal features. In such an example, an input of a feature vector comprising currently observed user signal features may result in the output of a determination of a probability that User 2 will or will not read messages having certain features (e.g. from a particular sender, having particular words in a subject line or body, etc.) based upon the current user signal features.

Any suitable methods may be used to train such a machine learning model. In some examples, a supervised training approach may be used in which data having a known outcome based upon known user signal features has been labeled with the outcome and used for training. In some such examples, training data may be observed during use and labeled based upon user actions at the time of observation. For example, User 2 may receive a message from a particular sender, domain, etc. at a particular time and location, open the message, then mark it as unread, and then reopen the message later to read it. Thus, features from the User 2 user signals taken from the time the message was marked as unread may be labeled with the message features (e.g. message sender, sender domain, etc.) and a result of not having been read, and used as training data. Likewise, features from the User 2 user signals taken from the time the message was re-read may be labeled with the message features and as having been read. The use of a suitable number of such observations may allow a machine learning function to be trained to recognize combinations of user signal features that indicate a likelihood of messages having particular message features being read or not being read, and then to output contextual events based upon this determination.

Unsupervised machine learning also may be used, in which user signals may be received as unlabeled data, and patterns are learned over time. Suitable unsupervised machine learning algorithms may include K-means clustering models, Gaussian models, and principal component analysis models, among others. Such approaches may produce, for example, a cluster, a manifold, or a graph that may be used to make predictions related to contexts in which a user may wish to read messages having particular features based upon features in current user signals.

Inferences obtained via observation or deeper analysis of User 2's user signals are persisted, at 432, in User 2 data store 418, and provided to the message trigger framework 422 as type of contextual event. The dotted arrows illustrated in FIG. 4 indicate that the flow of data may occur continuously/periodically, rather than in response to a request for the data.

As indicated at 434, the message trigger framework 422 reads messages stored in the User 2 data store 418, including the contextual information determined for and stored with the message, and determines when any of the contextual events 424 matches one or more triggering conditions of any of the messages based on the contextual information for the messages. As one example, if a message in the User 2 data store 418 includes information that the message should be sent while User 2 is on the way to the airport for a flight (e.g. "Tell User 2 to go to the post office on the way to the airport"), message context analysis module 420 may determine that the message is relevant to travel toward the airport, and then send the message when it is detected that User 2 is en route to the airport based on location, or at a particular time based upon the time of a scheduled flight time of User 2.

The message trigger framework 422 may automatically determine when a contextual event matches a triggering condition of a message, without User 1 having any knowledge of User 2's context. For example, User 1 may leave a message for User 2 to pick up an item when User 2 is near a grocery store. User 1 does not need to actually know that User 2 is near a grocery store before sending such a message, but may input the message at an earlier time and rely on the automatic contextual delivery of the message at a later time, as determined by the message trigger framework 422.

In some examples, User 1 may inquire as to whether a message has been delivered to User 2 and/or update a desired delivery context for the message. For example, User 1 may decide to go to the grocery store, in which case User 1 may request cancellation of delivery of the message or update content of the message before delivery of the original message to User 2. As mentioned above, the remember service 417 may determine the read/not read status of messages sent by User 1 and stored in the User 2 data store, thereby allowing User 1 to learn whether a message has been read, and to update a message stored in the User 2 data store.

In response to detecting a contextual event that matches a triggering condition of one or more messages, the message trigger framework 422 sends the messages, at 436, to messaging delivery module 438, which in turn sends message notifications 440 to an end user device 441 of User 2. The messages are then delivered, at 442, to User 2 via an output of the end user device 441. Though end user device 441 of User 2 is shown as a digital assistant device, it will be understood that User 2 may receive the message at any suitable computing device. In some examples, the contextual messaging framework 406 may be configured to determine a currently active device (e.g. a device currently being used by User 2) and send the message to the currently active device, but not to other devices of User 2 at that time.

Where the message is an email message, a copy of the message may persist in the User 2 data store after having been delivered to one or more client devices of User 2. In contrast, in the case of text messaging, no offline copy of the message may exist at the User 2 data store once delivered to a client device.

If User 2 replies to the message, User 2's reply message may be delivered to User 1 in the same manner as described above. Further, in some examples, User 2 may change a list of intended recipients compared to the message sent by User 1. For example, in the case of email messages, each reply carries the copy of all the previous conversation as text copy, and thus every reply is a new object ID and the number of recipients for the object ID can be more or less from the previous one in the same email thread. In contrast, in messaging, there is a concept of session and thus a new message is in context of the previous messages exchanged in the session.

The above-described examples relate to manners in which a message may be sent automatically to a recipient based on contextual events detected from user signals of User 2. In other examples, messages may be sent to the recipient reactively, e.g. based on User 2 requesting the messages. As indicated at 444, User 2 may request the presentation of messages at an end user device 445. The user request is provided to a messaging retrieval module 446 of the contextual messaging framework 406. The message retrieval module 446 then forwards the request to the User 2 data store 418, which then provides the request to the message trigger framework 442 as a type of contextual event. Based upon this contextual event, the message trigger framework 442 triggers the delivery of the requested messages.

In some instances, User 2 may request delivery of all messages. In other instances, User 2 may request delivery of only some messages based upon contextual information contained in the message request. FIG. 4 illustrates one or more filter(s) 448 for filtering messages from User 2 data store 418 based on the content and/or context of the user request. For example, User 2 may ask in the user request for messages from a particular person, messages from work contacts, messages from family members, etc. Upon receipt of such a request, messaging retrieval module 446 may access a people graph 450 for User 2 to resolve the identity (or identities) of the person(s) specified in the message request to be used as a filter in identifying messages for delivery. Messages with contextual information that match the content/context of the user request may be retrieved from User 2 data store 418 for sending to messaging delivery 438, and to the end user device 445 of User 2 for output.

It will be understood that the architecture of FIG. 4 is presented for example, and that other suitable architectures may be used. For example, in some architectures, a message sent to a group of recipients may be stored in a data store associated with a group ID, instead of in an individual data store for each intended recipient. In such examples, each of the members will have access to the data store of the group, and the message delivery framework may decide when to deliver/bring to the user's attention the messages/emails individually for the individual member of the group. In another example architecture, messages/emails can be stored on the client instead of or in addition to being stored on the server. In such examples, the message delivery framework may reside on the client along with a copy of learned inferences from the server. Based on the models, the messages/emails can be pulled from the server instead of push from server.

Figure 5A:
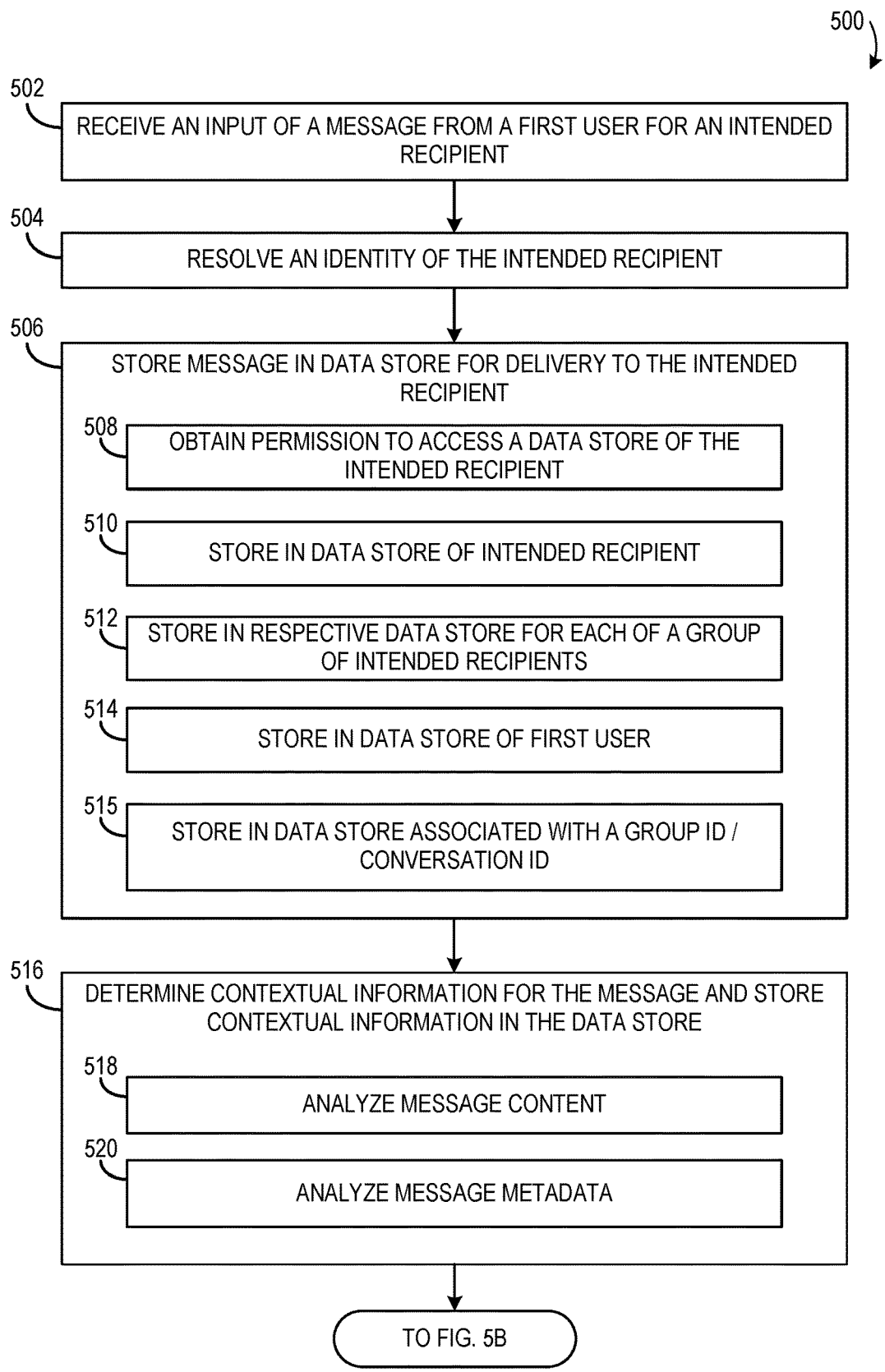
FIGS. 5A and 5B show a flow diagram illustrating an example method of delivering messages based on contextual events.
Figure 5B:
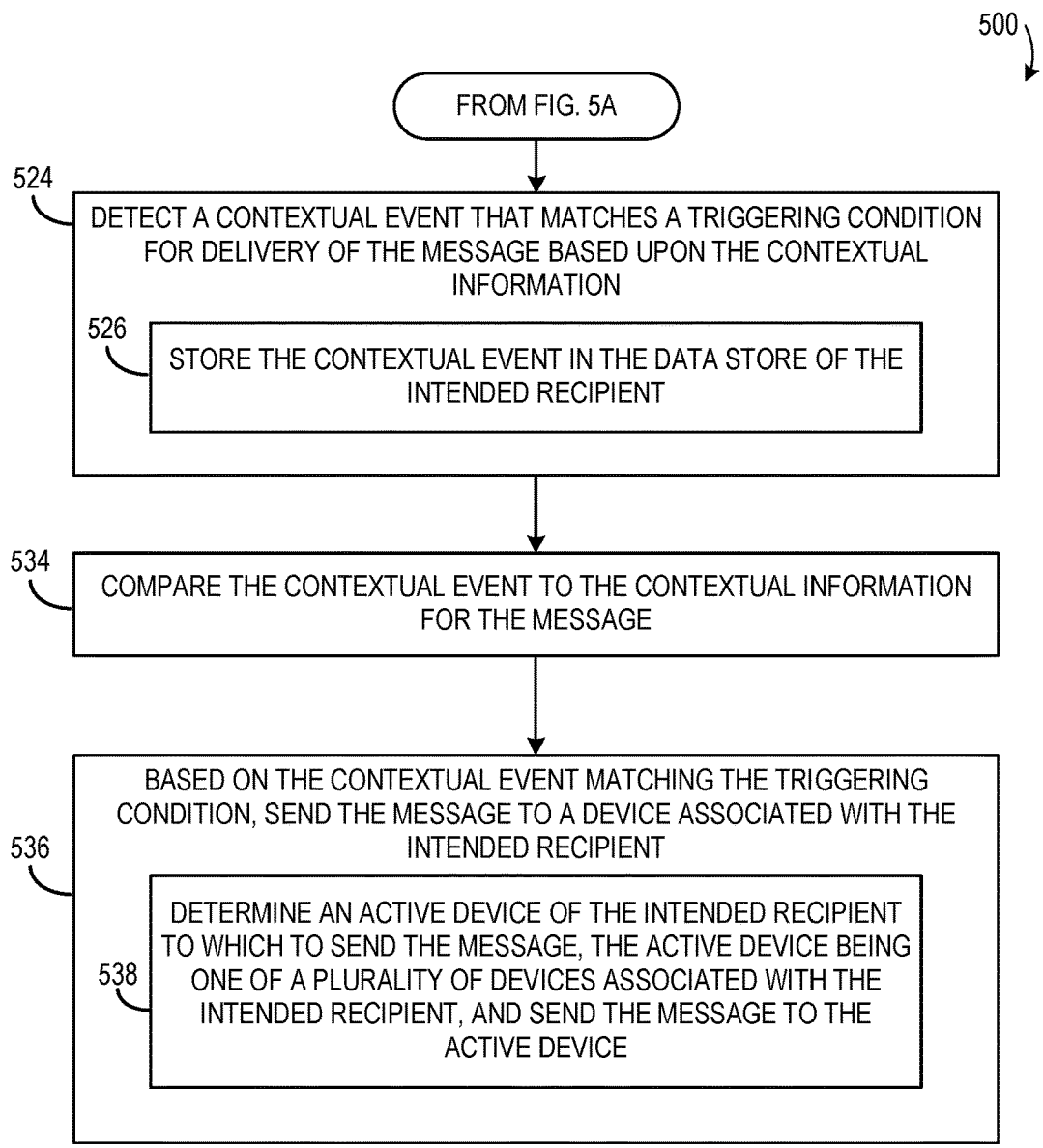

FIGS. 5A and 5B illustrate an example method 500 of sending messages based on contextual events. Method 500 may be enacted via any suitable computing device. Method 500 includes, at 502, receiving an input of a message from a first user for an intended recipient. The input may be received via a computing device of the first user, e.g. a mobile device, a computer, a personal assistant device, and may take any suitable form, such as a text message, an email, a voice message, etc., or received at a network-accessible service from the device at which the user input of the message was made.

Method 500 further includes, at 504, resolving an identity of the intended recipient based upon the input. Where ambiguity exists as to the identity of the intended recipient, any suitable method may be used to disambiguate the intended recipient, such as by outputting a request to verify more specifically which person is the intended recipient.

Method 500 next includes, at 506, storing the message in a data store for delivery to the intended recipient. Storing the message in the data store may include, at 508, obtaining permission to access a data store of the intended recipient, and storing the message in the data store of the intended recipient. As described above, obtaining permission may include obtaining an access token to the data store. The data store may be the data store of a single intended recipient 510, one of a respective data store for each of a group of intended recipients 512, a data store of the first user 514, or a common data store associated with a group ID or a conversation ID 515.

Method 500 further includes, at 516, determining contextual information for the message and storing the contextual information in the data store. The contextual information for the message may be determined, for example, by analyzing message content of the message, at 518, and/or metadata associated with the message, at 520.

Continuing with FIG. 5B, method 500 includes, at 524, detecting a contextual event that matches a triggering condition for delivery of the message based upon the contextual information. Examples of contextual events may include a determined habitual event, a user-designated event, a one-time event, a particular combination of features detected as indicative of a context of interest by a machine learning model, and a user request for the message. Where the contextual event comprises a user request, the user request may in some examples specify a subset of messages for delivery as identified by filtering, as described above. The contextual event may also be stored in the data store of the intended recipient, at 526.

Method 500 further includes, at 534, comparing the contextual event to the contextual information for the message. Comparing may be performed in any suitable manner. For example, where the contextual information for the message and the contextual events each comprise context-related keywords, the keywords from the contextual information for the message may be compared with keywords from the contextual event to seek matches between keywords. Likewise, where the contextual events comprise the detection of a threshold probability of messages having particular message features being read, then the comparing may comprise comparing the message features specified in the contextual event to the features of the received message. Continuing, method 500 further includes, at 536, based on the contextual event matching the triggering condition, sending the message to a device associated with the intended recipient. In some examples, this may include, at 538, determining an active device of the intended recipient, where the active device is one of a plurality of devices associated with the intended recipient, and sending the message to the active device.

Instead of storing the message and sending it at a later time, as described above in examples, in some examples, the message may also be sent to the intended recipient in real time, e.g. when no contextual information has been determined for the message, when the contextual information indicates that the message is to be sent in real time, or when a current context of the intended recipient immediately matches the contextual information for the message.

As described above, the methods and processes described herein may be tied to a computing system of one or more computing devices. In particular, such methods and processes may be implemented as a computer-application program or service, an application-programming interface (API), a library, and/or other computer-program product.

Figure 6:
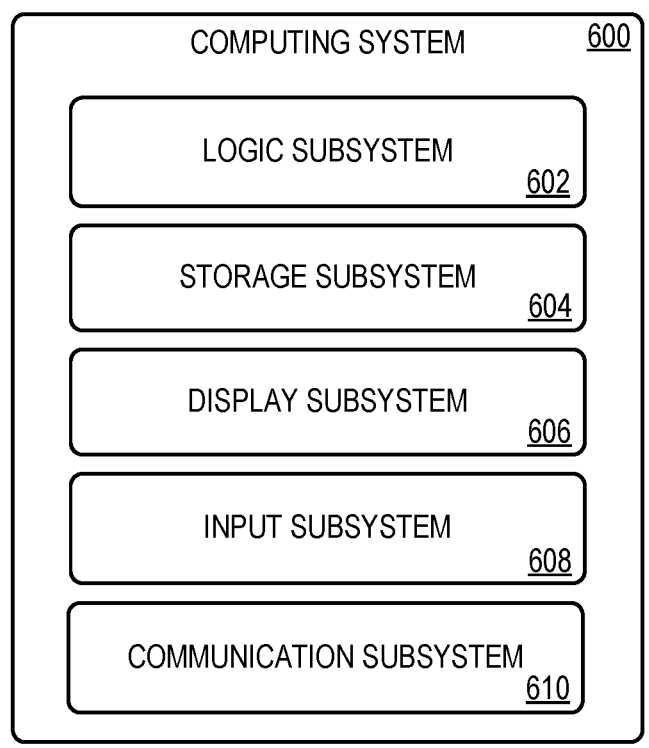
FIG. 6 shows a block diagram of an example computing system.

FIG. 6 schematically shows a non-limiting embodiment of a computing system 600 that can enact one or more of the methods and processes described above. The computing system 600 is shown in simplified form. The computing system 600 may take the form of one or more personal computers, server computers, tablet computers, home-entertainment computers, network computing devices, gaming devices, mobile computing devices, mobile communication devices (e.g., smart phone), and/or other computing devices.

The computing system 600 includes a logic subsystem 602 and a storage subsystem 604. The computing system 600 may optionally include a display subsystem 606, input subsystem 608, communication subsystem 610, and/or other components not shown in FIG. 6.

The logic subsystem 602 includes one or more physical devices configured to execute instructions. For example, the logic subsystem 602 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem 602 may include one or more processors configured to execute software instructions. Additionally or alternatively, the logic subsystem 602 may include one or more hardware or firmware logic machines configured to execute hardware or firmware instructions. Processors of the logic subsystem 602 may be single-core or multi-core, and the instructions executed thereon may be configured for sequential, parallel, and/or distributed processing. Individual components of the logic subsystem 602 optionally may be distributed among two or more separate devices, which may be remotely located and/or configured for coordinated processing. Aspects of the logic subsystem 602 may be virtualized and executed by remotely accessible, networked computing devices configured in a cloud-computing configuration.

The storage subsystem 604 includes one or more physical devices configured to hold instructions executable by the logic machine to implement the methods and processes described herein. When such methods and processes are implemented, the state of the storage subsystem 604 may be transformed—e.g., to hold different data.

The storage subsystem 604 may include removable and/or built-in devices. The storage subsystem 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. The storage subsystem 604 may include volatile, nonvolatile, dynamic, static, read/write, read-only, random-access, sequential-access, location-addressable, file-addressable, and/or content-addressable devices.

It will be appreciated that the storage subsystem 604 includes one or more physical devices. However, aspects of the instructions described herein alternatively may be propagated by a communication medium (e.g., an electromagnetic signal, an optical signal, etc.) that is not held by a physical device for a finite duration.

Aspects of the logic subsystem 602 and the storage subsystem 604 may be integrated together into one or more hardware-logic components. Such hardware-logic components may include field-programmable gate arrays (FPGAs), program- and application-specific integrated circuits (PA-SIC/ASICs), program- and application-specific standard products (PSSP/ASSPs), system-on-a-chip (SOC), and complex programmable logic devices (CPLDs), for example.

The term "module" may be used to describe an aspect of computing system 600 implemented to perform a particular function. In some cases, a module may be instantiated via logic subsystem 602 executing instructions held by storage subsystem 704. It will be understood that different modules application, service, code block, object, library, routine, API, function, etc. Likewise, the same module may be instantiated by different applications, services, code blocks, objects, routines, APIs, functions, etc. The term module may encompass individual or groups of executable files, data files, libraries, drivers, scripts, database records, etc.

A "service" as used herein is an application program executable across multiple user sessions. A service may be available to one or more system components, programs, and/or other services. In some implementations, a service may run on one or more server-computing devices.

When included, the display subsystem 606 may be used to present a visual representation of data held by the storage subsystem 604. This visual representation may take the form of a graphical user interface (GUI). As the herein described methods and processes change the data held by the storage machine, and thus transform the state of the storage machine, the state of the display subsystem 606 may likewise be transformed to visually represent changes in the underlying data. The display subsystem 606 may include one or more display devices utilizing virtually any type of technology. Such display devices may be combined with the logic subsystem 602 and/or the storage subsystem 604 in a shared enclosure, or such display devices may be peripheral display devices.

When included, the input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, the communication subsystem 610 may be configured to communicatively couple the computing system 600 with one or more other computing devices. The communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem 610 may allow the computing system 600 to send and/or receive messages to and/or from other devices via a network such as the Internet.

Another example provides a computing system comprising a logic subsystem and a storage subsystem comprising instructions executable by the logic subsystem to receive an input of a message, store the message in a data store for delivery to an intended recipient, determine contextual information for the message and store the contextual information for the message in the data store, detect a contextual event that matches a triggering condition for delivery of the message based upon the contextual information for the message, and based upon the contextual event matching the triggering condition, send the message to a device associated with the intended recipient. The instructions may be additionally or alternatively executable to store the message in the data store are executable to store the message in a data store of the intended recipient. The instructions may be additionally or alternatively executable to obtain permission to access the data store of intended recipient prior to storing the message. The intended recipient may additionally or alternatively be one of a group of intended recipients, and the instructions may be additionally or alternatively executable to store the message in a respective data store for each intended recipient. The instructions may be additionally or alternatively executable to resolve an identity of the intended recipient prior to storing the message in the data store of the intended recipient. The instructions may be additionally or alternatively executable to determine an active device of the intended recipient to which to send the message, the active device being one of a plurality of devices associated with the intended recipient, and to send the message to the active device. The message may additionally or alternatively include one or more of a text message and an email message. The contextual event may additionally or alternatively include one or more of a determined habitual event, a user-designated event, a detected one-time event, and an output of a trained machine learning model regarding one or more user signal features that indicate a likelihood that messages having particular message features will be read. The instructions may be additionally or alternatively executable to store the contextual event in the data store of the intended recipient. The instructions may be additionally or alternatively executable to determine the contextual information by analyzing content of the message. The instructions may be additionally or alternatively executable to detect the contextual event that matches the triggering condition by comparing one or more keywords identified in the content of the message to one or more keywords specified in the contextual event. The instructions may be additionally or alternatively executable to determine the contextual information by analyzing metadata for the message. The contextual event may additionally or alternatively include a user request for the message. The instructions may be additionally or alternatively executable to filter messages in the data store based on one or more of a context of the user request and a content of the user request and retrieve the message from a plurality of messages stored based on the filtering.

Another example provides, on a computing device, a method comprising receiving an input of a message, storing the message in a data store for delivery to an intended recipient, determining contextual information for the message and storing the contextual information for the message in the data store, detecting a contextual event that matches a triggering condition for delivery of the message, and based upon the contextual event matching the triggering condition, sending the message to a device associated with the intended recipient. The contextual event may additionally or alternatively include one or more of a determined habitual event, a user-designated event, and a detected one-time event, and a machine learning model-detected event. Determining contextual information may additionally or alternatively include analyzing content of the message, and wherein detecting the contextual event that matches the triggering condition comprises comparing the contextual event to the contextual information associated with the message. The contextual event may additionally or alternatively include a user request for the message, and wherein the method further comprises filtering messages in the data store based on one or more of a content of the user request and a context of the user request.

Another example provides a computing system, comprising a logic subsystem, and a storage subsystem comprising instructions executable by the logic subsystem to receive an input of a message from a first user, the message being intended for a second user, store the message in a data store of the second user, determine contextual information for the message and store the contextual information for the message in the data store, analyze message content and associate contextual information with the message based on analyzing the message content, detect a contextual event that matches a triggering condition for delivery of the message by comparing the contextual event to the contextual information associated with the message, and based upon the contextual event matching the triggering condition, send the message to a device associated with the second user. The contextual event may additionally or alternatively include one or more of a determined habitual event, a user-designated event, a detected one-time event, and a user request for the message.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
a digital assistant device having a digital personal assistant service operating thereon;
a logic subsystem; and
a storage subsystem comprising instructions executable by the logic subsystem that cause the digital personal assistant service to:
receive, by the digital assistant device, an input of an audio message that includes an audio indication of an intended recipient,
determine an identity of the intended recipient based at least in part on the audio indication,
store the audio message in a data store for delivery to the intended recipient,
determine contextual information, based at least in part on an analysis of the audio message, and store the contextual information for the audio message in the data store,
determine a contextual event associated with the intended recipient, based at least in part on an analysis of user signals associated with the intended recipient, and store the contextual event in the data store,
compare the contextual event to the contextual information determined for the audio message,
detect the contextual event matching a triggering condition for delivery of the audio message based at least in part on a comparison of the contextual information determined for the audio message with at least one of a location, a time, a keyword, a user action, a device identification, device activity, email content, calendar data, search data, an output of a trained machine learning model, application usage, sensor data, a presence of a network connection, activity patterns, a user request, a user-designated event, or a user-designated filtering, and based upon the contextual event matching the triggering condition, send the audio message to the intended recipient by way of the digital assistant device.

2. The computing system of claim 1, wherein the instructions executable to store the audio message in the data store are executable to store the audio message in a data store of the intended recipient.

3. The computing system of claim 2, wherein the instructions are further executable to obtain permission to access the data store of the intended recipient prior to storing the audio message.

4. The computing system of claim 2, wherein the intended recipient is one of a group of intended recipients, and wherein the instructions are further executable to store the audio message in a respective data store for each intended recipient.

5. The computing system of claim 2, wherein the instructions are further executable to resolve the identity of the intended recipient based at least in part on a people graph associated with a sender of the audio message, or user input received in response to a prompt requesting a specific identity of the intended recipient.

6. The computing system of claim 1, wherein the instructions are further executable to determine an active device of the intended recipient to which to send the audio message, the active device being one of a plurality of devices associated with the intended recipient, and to send the audio message to the active device.

7. The computing system of claim 1, wherein the contextual event comprises one or more of a determined habitual event, the user-designated event, a detected one-time event, and the output of a trained machine learning model regarding one or more user signal features indicating a likelihood that messages having particular message features will be read.

8. The computing system of claim 1, wherein the instructions are further executable to store the contextual event in the data store of the intended recipient.

9. The computing system of claim 1, wherein the instructions are further executable to determine the contextual information by analyzing content of the audio message.

10. The computing system of claim 9, wherein the instructions are executable to detect the contextual event matching the triggering condition by comparing one or more keywords identified in the content of the audio message to one or more keywords specified in the contextual event.

11. The computing system of claim 1, wherein the instructions are further executable to determine the contextual information by analyzing metadata for the audio message.

12. The computing system of claim 1, wherein the contextual event comprises the user request for the audio message.

13. The computing system of claim 12, wherein the instructions are further executable to filter messages in the data store based on one or more of a context of the user request and a content of the user request and retrieve the audio message from a plurality of messages stored based on the filtering.

14. A method comprising:
by way of a digital personal assistant service operating on a digital assistant device:
receiving via the digital assistant device, from a user, an input of an audio message that includes an audio indication of an intended recipient;
determining an identity of the intended recipient based at least in part on the audio indication, storing the audio message in a data store for delivery to the intended recipient, the delivery based at least in part on a triggering condition;

determining contextual information, based at least in part on an analysis of the audio message, and storing the contextual information for the audio message in the data store;

prior to the delivery of the audio message to the intended recipient, receiving from the user an update to content of the audio message;

updating the content of the audio message with the update received from the user;

determining a contextual event associated with the intended recipient, based at least in part on an analysis of user signals associated with the intended recipient, and storing the contextual event in the data store, comparing the contextual event to the contextual information determined for the audio message, detecting the contextual event matching the triggering condition for delivery of the audio message based at least in part on a comparison of the contextual information determined for the audio message with at least one of a location, a time, a keyword, a user action, a device identification, device activity, email content, calendar data, search data, an output of a trained machine learning model, application usage, sensor data, a presence of a network connection, activity patterns, a user request, a user-designated event, or a user-designated filtering; and based upon the contextual event matching the triggering condition, sending, from the digital personal assistant service, the audio message to a device associated with the intended recipient.

15. The method of claim 14, wherein the contextual event comprises one or more of a determined habitual event, the user-designated event, a detected one-time event, and a machine learning model-detected event.

16. The method of claim 14, wherein determining the contextual information comprises analyzing the content of the audio message.

17. The method of claim 14, wherein the contextual event comprises a user request for the audio message, and wherein the method further comprises filtering messages in the data store based on one or more of a content of the user request and a context of the user request.

18. A computing system, comprising:
a digital assistant device having a digital personal assistant service operating thereon;
a logic subsystem; and
a storage subsystem comprising instructions executable by the logic subsystem that cause the digital personal assistant service to:
receive, by the digital assistant device, an input of an audio message from a first user, the audio message being intended for a second user and comprising an audio indication of the second user,
determine an identity of the second user based at least in part on the audio indication,
store the audio message in a data store of the second user,
determine contextual information, based at least in part on an analysis of the audio message, and store the contextual information for the audio message in the data store,
analyze message content of the audio message and associate the contextual information with the audio message based on analyzing the message content,
determine a contextual event associated with the second user, based at least in part on an analysis of user signals associated with the second user, and store the contextual event in the data store,
compare the contextual event to the contextual information determined for the audio message,
detect the contextual event matching a triggering condition for delivery of the audio message based at least in part on a comparison of the contextual information determined for the audio message with at least one of a location, a time, a keyword, a user action, a device identification, device activity, email content, calendar data, search data, an output of a trained machine learning model, application usage, sensor data, a presence of a network connection, activity patterns, a user request, a user-designated event, or a user-designated filtering, and
based upon the contextual event matching the triggering condition, send the audio message via the digital personal assistant service to a device associated with the second user.

19. The computing system of claim 18, wherein the contextual event comprises a probability that the second user will consume the audio message.

20. The computing system of claim 18, wherein the digital personal assistant service is at least partially cloud-based.

* * * * *